United States Patent [19]
Konefal

[11] Patent Number: 5,662,945
[45] Date of Patent: Sep. 2, 1997

[54] INJECTION BLOW MOLDING MACHINE WITH STACKED MOLDS

[75] Inventor: Robert S. Konefal, Wilton, N.H.

[73] Assignee: Owens-Brockway Plastic Products Inc., Toledo, Ohio

[21] Appl. No.: 599,917

[22] Filed: Feb. 12, 1996

Related U.S. Application Data

[62] Division of Ser. No. 388,928, Feb. 15, 1995, Pat. No. 5,552,105.

[51] Int. Cl.$^6$ .................... B29C 49/06; B29C 49/36
[52] U.S. Cl. .................... 425/136; 425/150; 425/234; 425/533; 425/540; 425/541
[58] Field of Search .................... 425/533, 540, 425/541, 538, 136, 150, 234

[56] References Cited

U.S. PATENT DOCUMENTS

| | | | |
|---|---|---|---|
| 1,062,072 | 5/1913 | Wilson | 425/234 |
| 1,506,456 | 9/1924 | Van Hüllen | 156/405.1 |
| 1,619,020 | 3/1927 | Gammeter | 425/234 |
| 1,642,755 | 9/1927 | Ward | 425/234 |
| 1,937,169 | 11/1933 | Robinson | 425/234 |
| 2,347,600 | 4/1944 | Goode | 425/234 |
| 2,393,503 | 1/1946 | Bosomworth et al. | 425/234 |
| 2,463,560 | 3/1949 | Rempel | 425/234 |
| 2,550,687 | 5/1951 | Goss | 264/327 |
| 2,663,905 | 12/1953 | Van Riper et al. | 425/234 |
| 2,681,472 | 6/1954 | Rempel | 425/234 |
| 2,748,434 | 6/1956 | Arno | 425/113 |
| 2,848,743 | 8/1958 | Mercier | 425/234 |
| 2,869,177 | 1/1959 | Jurgeleit | 425/234 |
| 3,455,373 | 7/1969 | Bedell | 164/258 |
| 3,480,993 | 12/1969 | Schjeldahl et al. | 264/538 |
| 3,669,601 | 6/1972 | Lainesse | 425/234 |
| 3,707,591 | 12/1972 | Chalfant | 425/533 |
| 3,732,045 | 5/1973 | George et al. | 425/234 |
| 3,759,649 | 9/1973 | Tyler | 425/234 |
| 3,799,722 | 3/1974 | Johnson | 425/541 |
| 3,850,560 | 11/1974 | Farrell | 425/533 |
| 3,884,609 | 5/1975 | Britten | 425/533 |
| 3,947,181 | 3/1976 | Desjonqueres | 425/533 |
| 3,974,872 | 8/1976 | Buhrer | 249/126 |
| 3,986,806 | 10/1976 | Beyerlein et al. | 425/533 |
| 4,382,053 | 5/1983 | Rigby | 425/234 |
| 4,456,448 | 6/1984 | Pippert | 425/234 |
| 4,556,191 | 12/1985 | Mangogna | 249/119 |
| 4,636,348 | 1/1987 | Whiteside | 425/342.1 |
| 4,726,753 | 2/1988 | Gaigl | 425/234 |
| 4,743,192 | 5/1988 | Higuchi | 425/552 |
| 4,744,741 | 5/1988 | Glover et al. | 425/234 |
| 5,037,597 | 8/1991 | McGinley et al. | 425/556 |
| 5,069,615 | 12/1991 | Schad | 425/556 |
| 5,073,099 | 12/1991 | Kayano | 425/125 |
| 5,090,889 | 2/1992 | Döber et al. | 425/533 |
| 5,120,211 | 6/1992 | Ito et al. | 425/234 |
| 5,129,814 | 7/1992 | Farrell | 264/538 |
| 5,321,341 | 6/1994 | Kamp et al. | 264/538 |
| 5,518,392 | 5/1996 | Tate et al. | 425/540 |

Primary Examiner—Robert Davis

[57] ABSTRACT

A method and apparatus for forming plastic hollow articles such as containers which includes a turret that includes an upper head and a lower head, each of which supports circumferentially spaced sets of core rods. The heads are rotated about a vertical axis and also are moved upwardly and downwardly about the vertical axis for positioning the core rods within the cavities of upper injection mold and upper blow mold and a lower set of injection and a lower set of blow molds. Each mold has an upper half and a lower half. The lower half of the upper mold is mounted in fixed position and the upper half of the lower mold is mounted in fixed position. The upper half of the upper mold and the lower half of the lower mold are movable axially vertically toward and away from their respective fixed mold halves to close about parisons on the core rods. The upper and lower injection molds are supplied with molten plastic through a manifold to which molten plastic material is supplied from an extruder nozzle tip of an extruder.

20 Claims, 18 Drawing Sheets

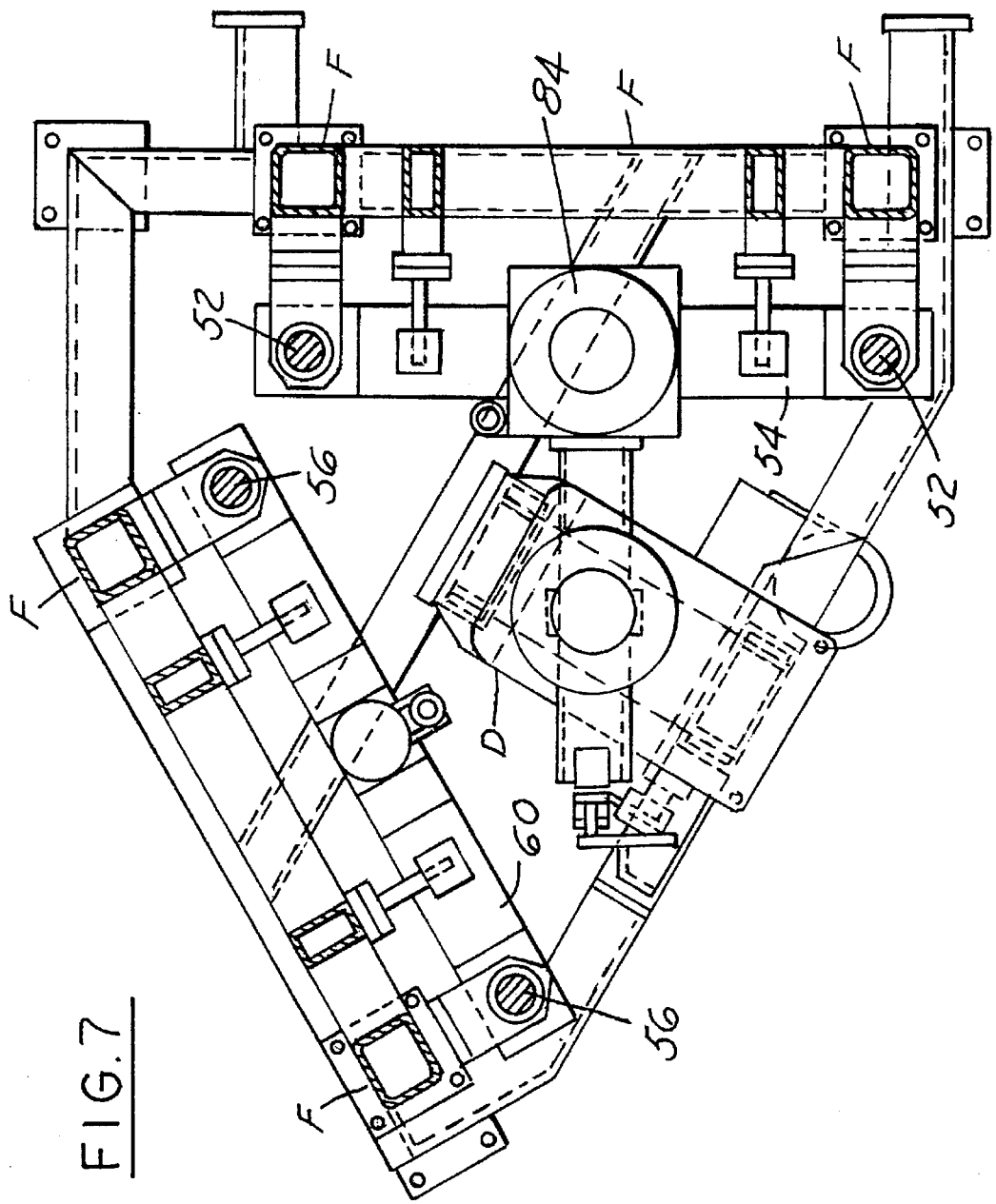

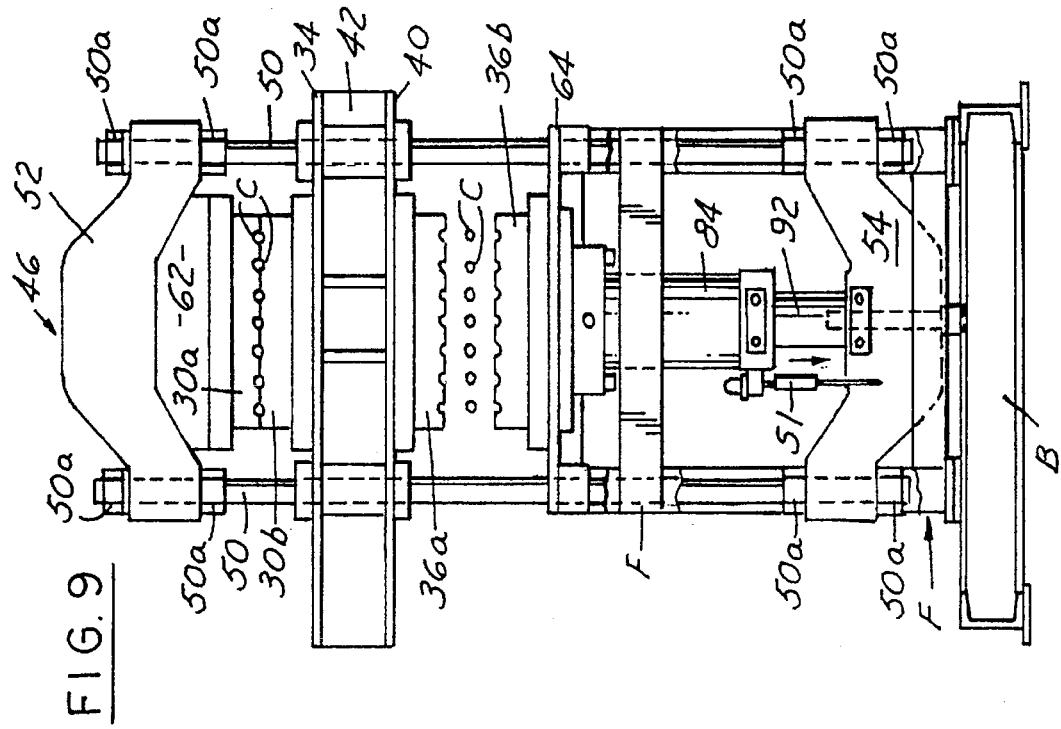
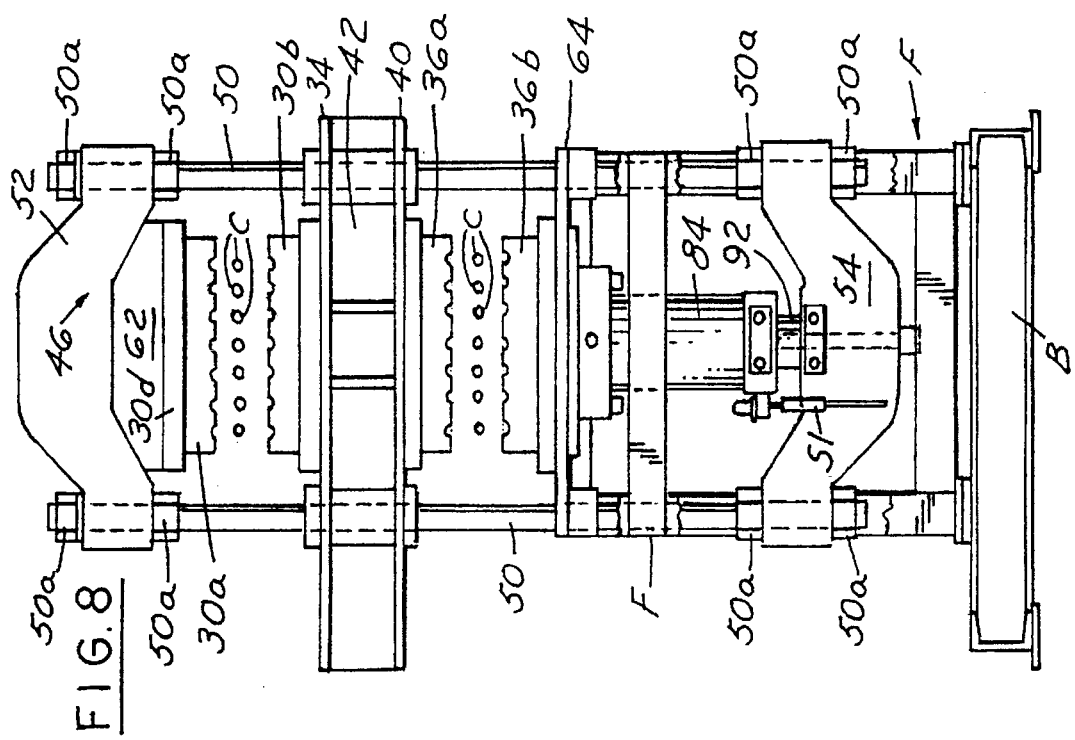

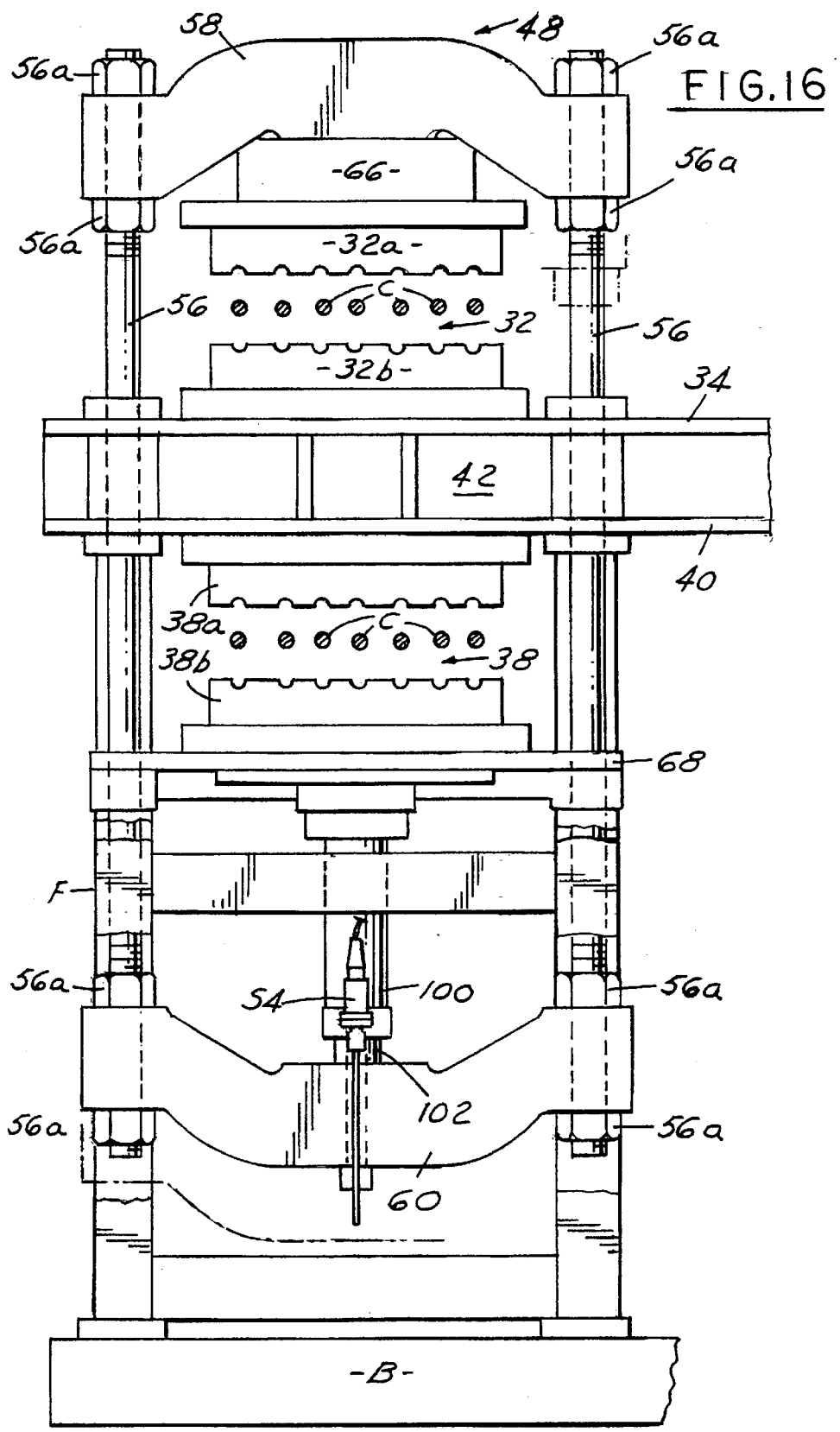

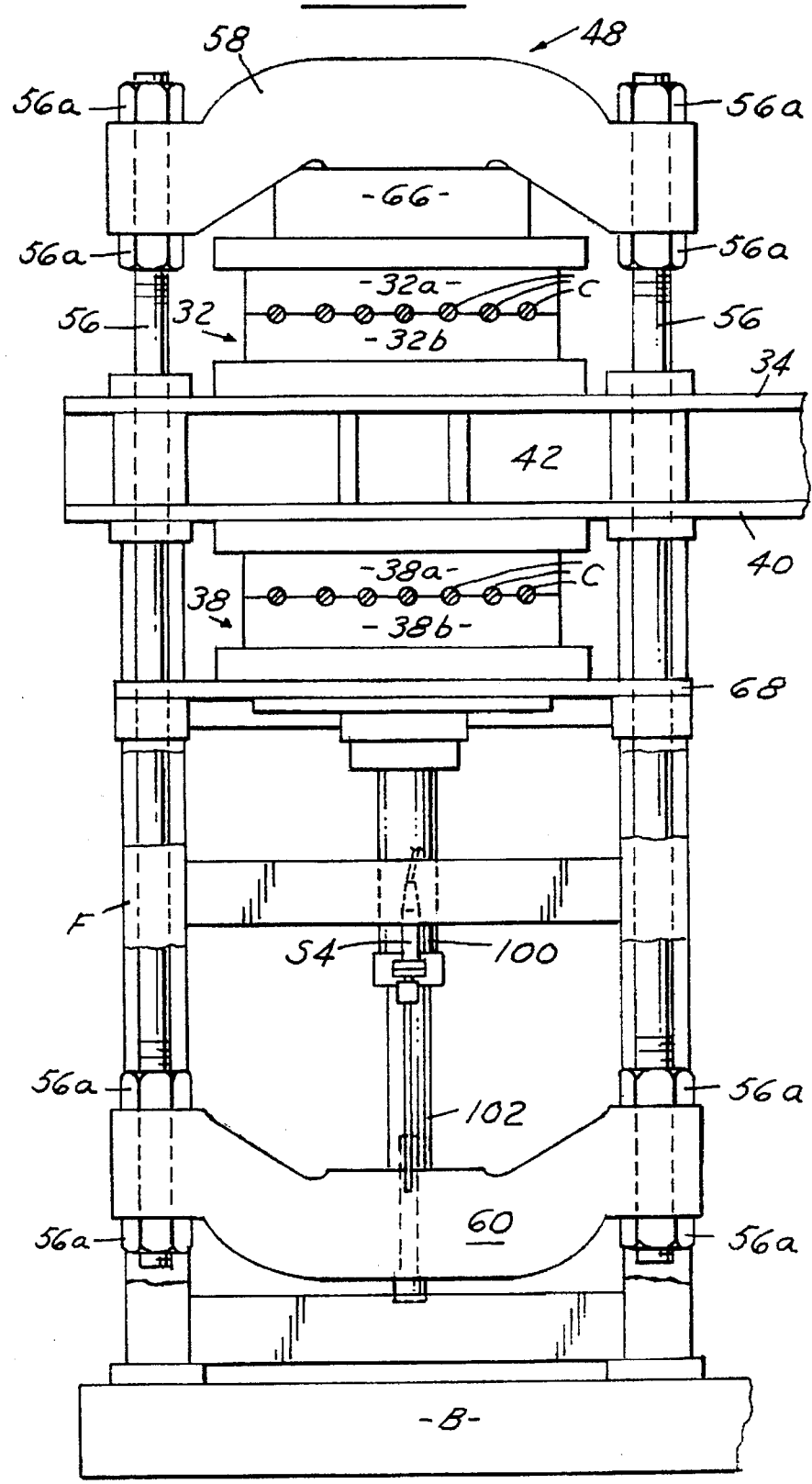

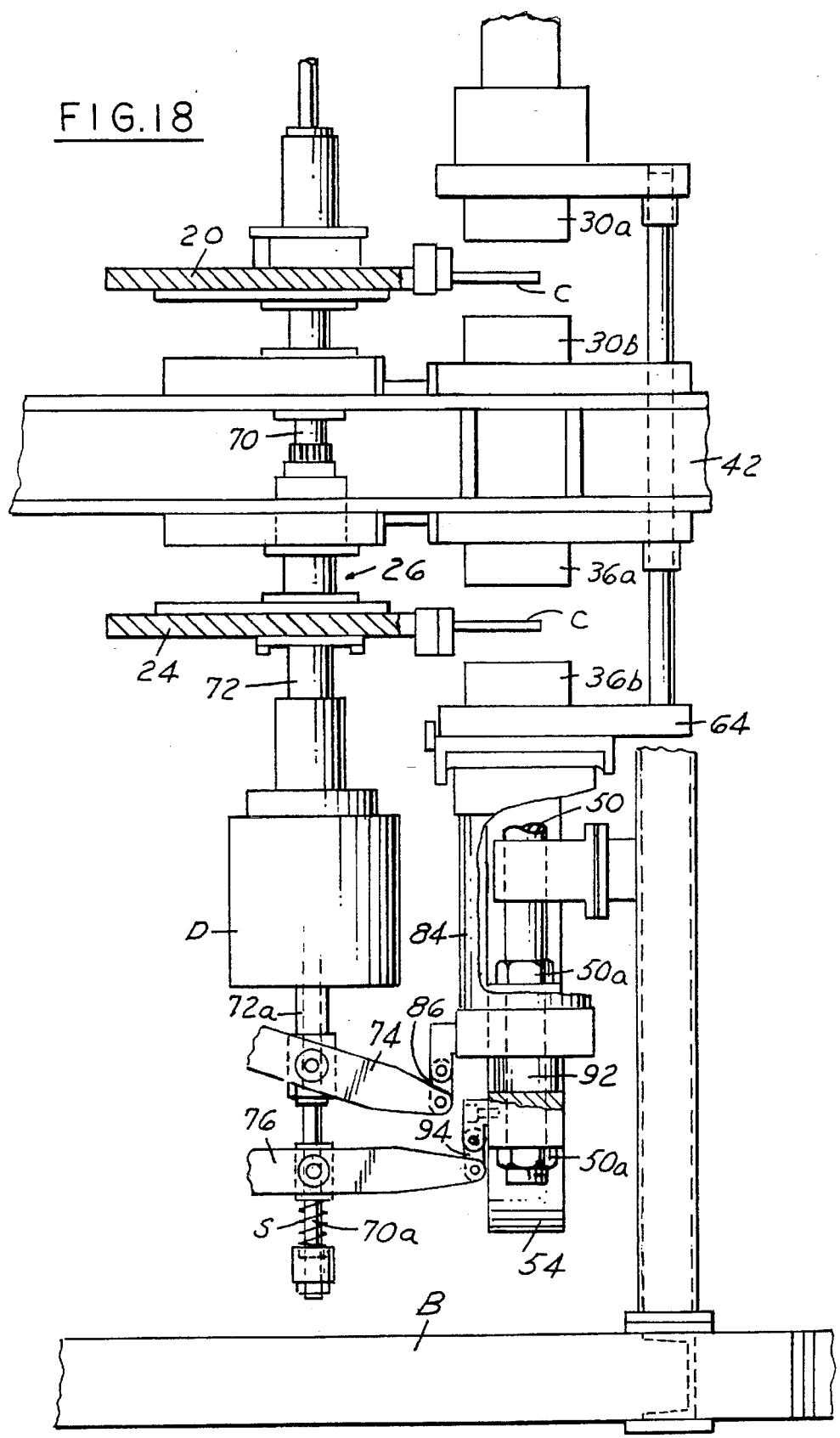

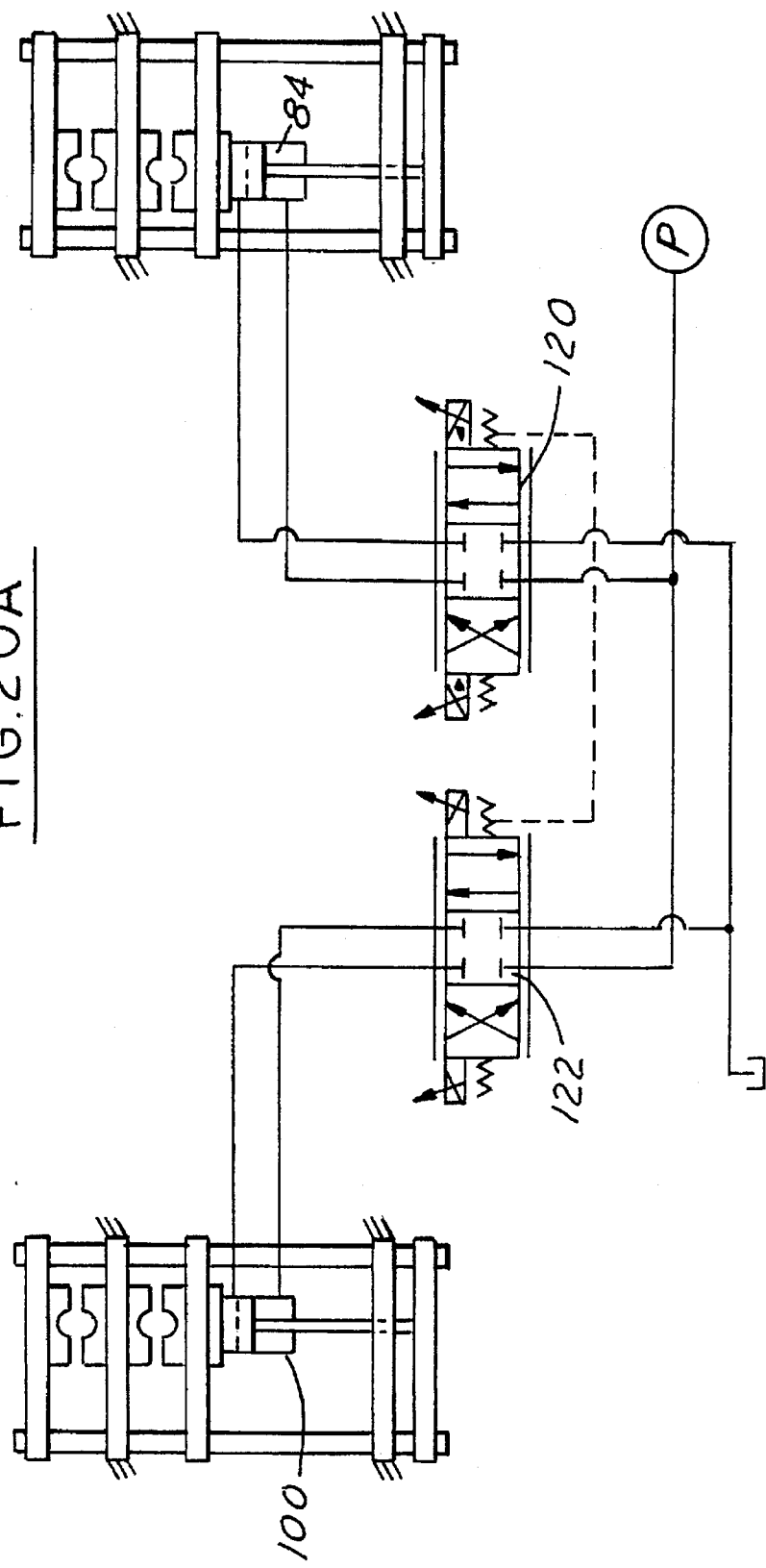

1

INJECTION BLOW MOLDING MACHINE WITH STACKED MOLDS

This is a divisional of application Ser. No. 08/388,928 filed on Feb. 15, 1995 now U.S. Pat. No. 5,552,105.

This invention relates to injection blow molding machines for forming plastic hollow articles such as containers and particularly to an injection blow molding machine incorporating plural stacks of injection molds and blow molds.

BACKGROUND AND SUMMARY OF THE INVENTION

In one type of injection blow molding machine for forming plastic hollow articles such as containers, known as the Jomar type or Rainville type, a turret supporting a plurality of sets of core rods is rotated about a vertical axis bringing each set of core rods successively into a first position for injection molding plastic parisons, a second position for blow molding a plurality of parisons and a third position where the blown hollow plastic articles are discharged. In such blow molding machines, a set of injection molding molds are provided at the first station and a set of blow molding molds are provided at the second station. The molds are opened simultaneously and closed simultaneously about the cores.

Among the objectives of the present invention are to provide an injection blow molding machine for forming plastic hollow articles such as containers which has an upper set and a lower set of molds which are associated with a turret supporting upper and lower sets of core rods, whereby a greater number of hollow containers or articles may be made; which machine can utilize existing molds; which does not substantially require an extended time cycle; and which utilizes the existing plant floor space as that for the conventional type machines.

In accordance with the invention, a method and apparatus is provided for forming plastic hollow articles such as containers which includes a turret that includes an upper head and a lower head, each of which supports circumferentially spaced sets of core rods. The heads are rotated about a vertical axis and also are moved upwardly and downwardly about the vertical axis for positioning the core rods within the cavities of upper injection mold and upper blow mold and a lower set of injection and a lower set of blow molds. Each mold has an upper half and a lower half. The lower half of the upper mold is mounted in fixed position and the upper half of the lower mold is mounted in fixed position. The upper half of the upper mold and the lower half of the lower mold are movable axially vertically toward and away from their respective fixed mold halves to close about parisons on the core rods. The upper and lower injection molds are supplied with molten plastic through a manifold to which molten plastic material is supplied from an extruder nozzle tip of an extruder.

DESCRIPTION OF THE EMBODIMENTS

FIG. 7 is a sectional view taken along the line 7—7 in FIG. 2.

FIG. 8 is an elevational view taken along the line 8—8 in FIG. 4, parts being broken away.

FIG. 9 is a view similar to FIG. 8 showing the apparatus in a different position in the cycle of injection and blow molding hollow containers.

FIG. 16 is an elevational view taken along the line 16—16 in FIG. 4, parts being broken away, showing the blow molds open.

FIG. 17 is a view similar to FIG. 16 showing the blow molds closed.

FIG. 18 is a fragmentary part sectional elevational view similar to FIG. 2, on an enlarged scale, parts being broken away.

Figure 20B:
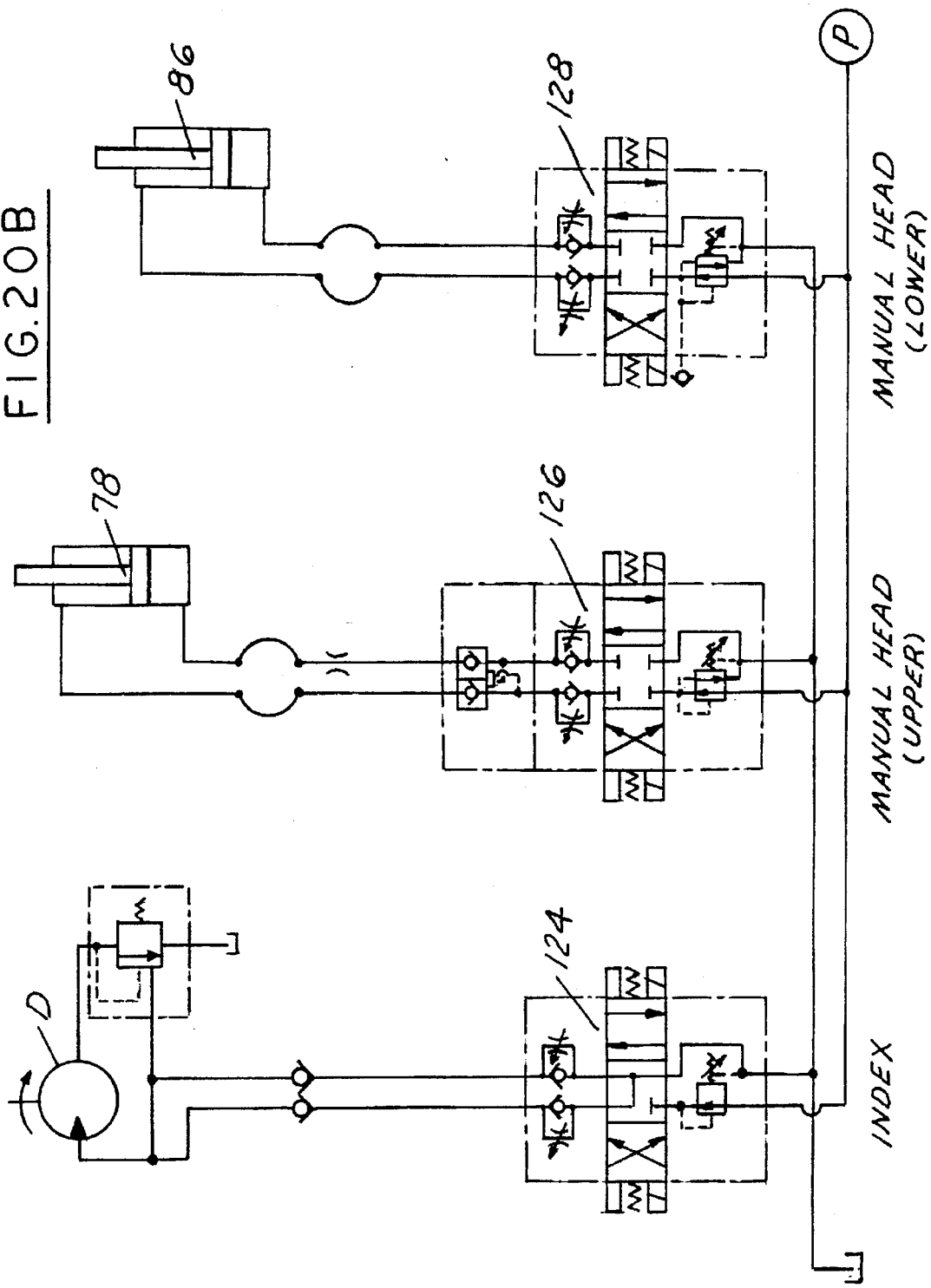

FIG. 20A and 20B a comprise a hydraulic circuit for the injection blow molding machine.

DESCRIPTION OF THE PREFERRED EMBODIMENTS

Figure 1:
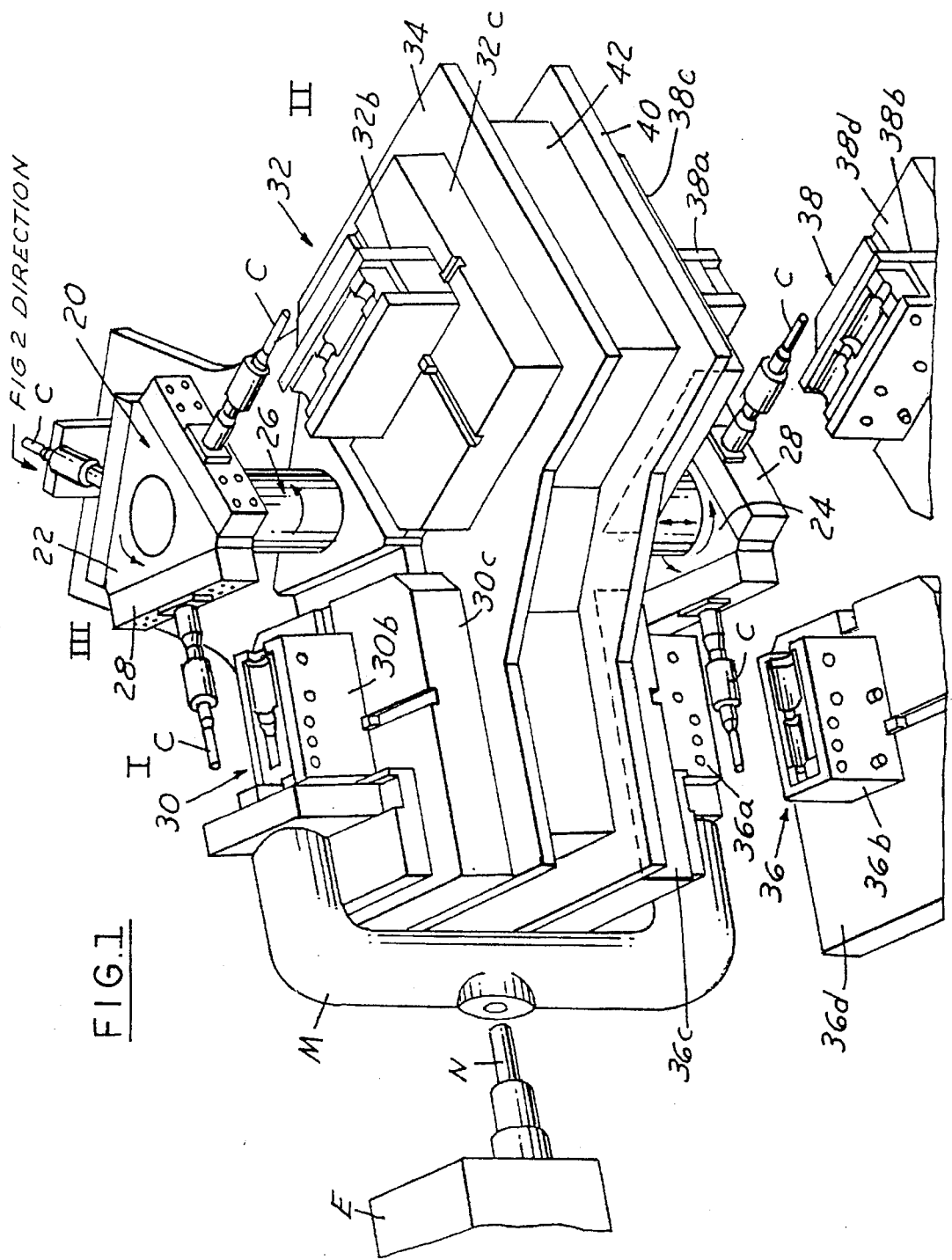
FIG. 1 is a perspective view of an injection blow molding machine with stacked molds embodying the invention, parts being broken away, taken in the direction of the arrow in FIG. 4.

Referring to FIG. 1, the injection blowing mold machine with stacked molds for forming plastic hollow articles such as containers embodying the invention includes a turret 20 having an upper turret head 22 and a lower turret head 24 mounted on a rotatable shaft 26 for rotation in the direction of the arrow as shown, and for vertical movement, as presently described. Each upper and lower turret head 22, 24 is in the shape of an equilateral triangle having three vertical surfaces. Each surface supports a core support plate 28 on its side surfaces and a plurality of core rods C are mounted in a horizontal row on the core support plates 28 and extend radially outwardly. An upper injection mold 30 and an upper blow mold 32 are provided above a stationary platen 42. A lower injection mold 36 and a lower blow mold 38 are provided below the stationary platen 42. Each mold set includes two mold halves.

For convenience of illustration in FIG. 1, the upper mold halves 30a and 32a of the upper molds 30, 32 are removed and only the lower mold halves 30b and 32b are shown mounted in fixed position on a lower plates 30c and 32c, respectively, removably fixed on upper plate 34 of stationary platen 42. Similarly, with respect to lower sets of molds, the upper mold half 36a of the lower injection mold 36 is supported on die plate 36c removably fixed on the underside of a plate 40 on platen 42. The lower mold half 36b of lower injection mold 36 is supported for vertical axial movement as presently described, toward and away from the mold half 36a. Similarly, the upper mold half 38a of the lower blow mold 38 is supported on a die plate 40 and fixed on the underside of the plate 40 on platen 42 and the lower half 38b is supported by a die plate 38d for vertical axial movement toward and away from the platen 42 as presently described. Plastic from an extruder E is supplied through a nozzle tip end and to a manifold M to each of the injection molds 30, 36.

As presently described, the turret 20 is successively indexed to a first station I where the injection mold halves close about the core rods C and plastic is injected to form the parisons about the core rods C, then to a second station II where the blow mold halves close about the parisons on the core rods C and the parisons are blown to form a hollow article such as a container and then a third station III where the blown articles are removed from the core rods C.

Figure 3:
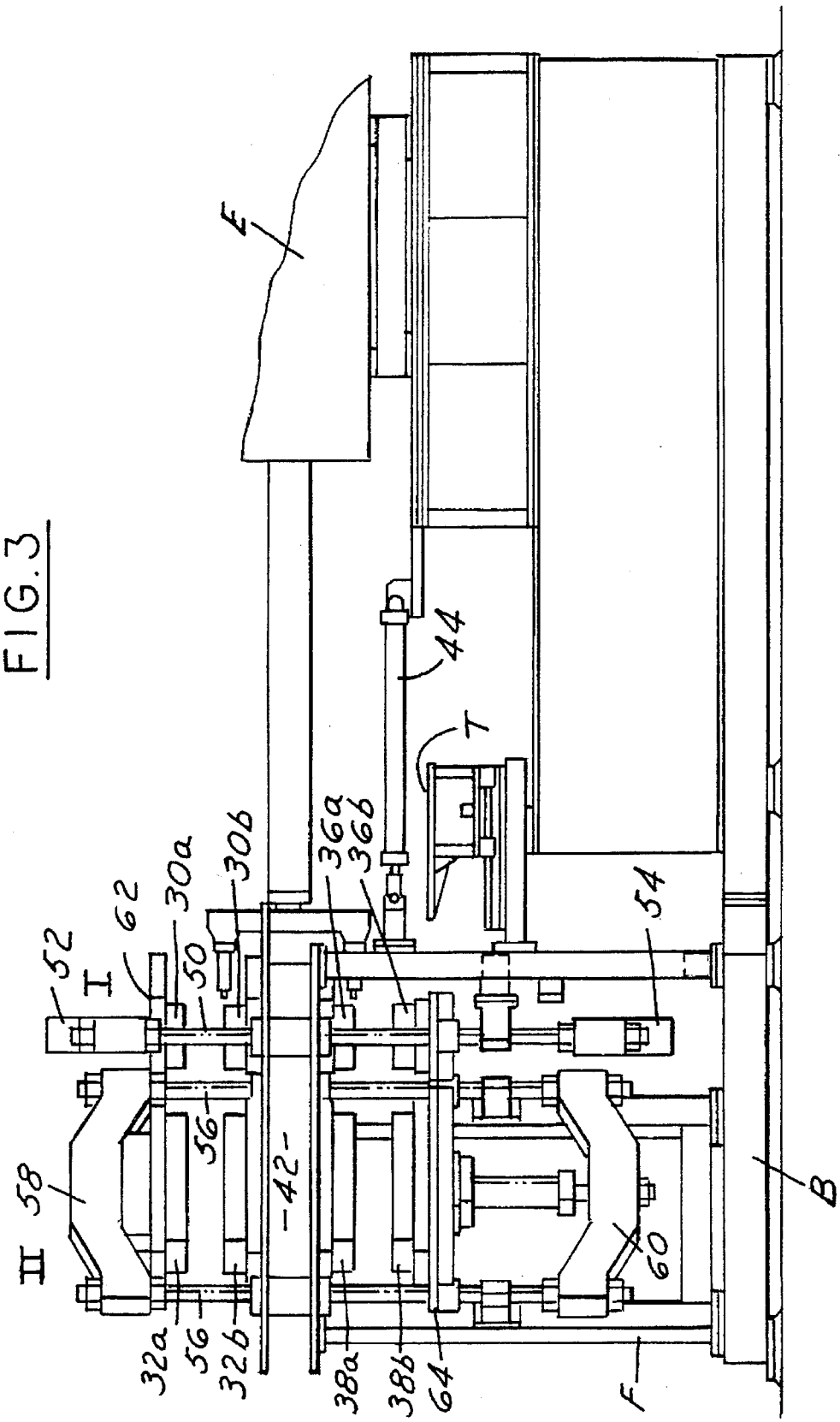
FIG. 3 is a front elevational view of the blow molding machine and a portion of an extruder, parts being broken away.
Figure 4:
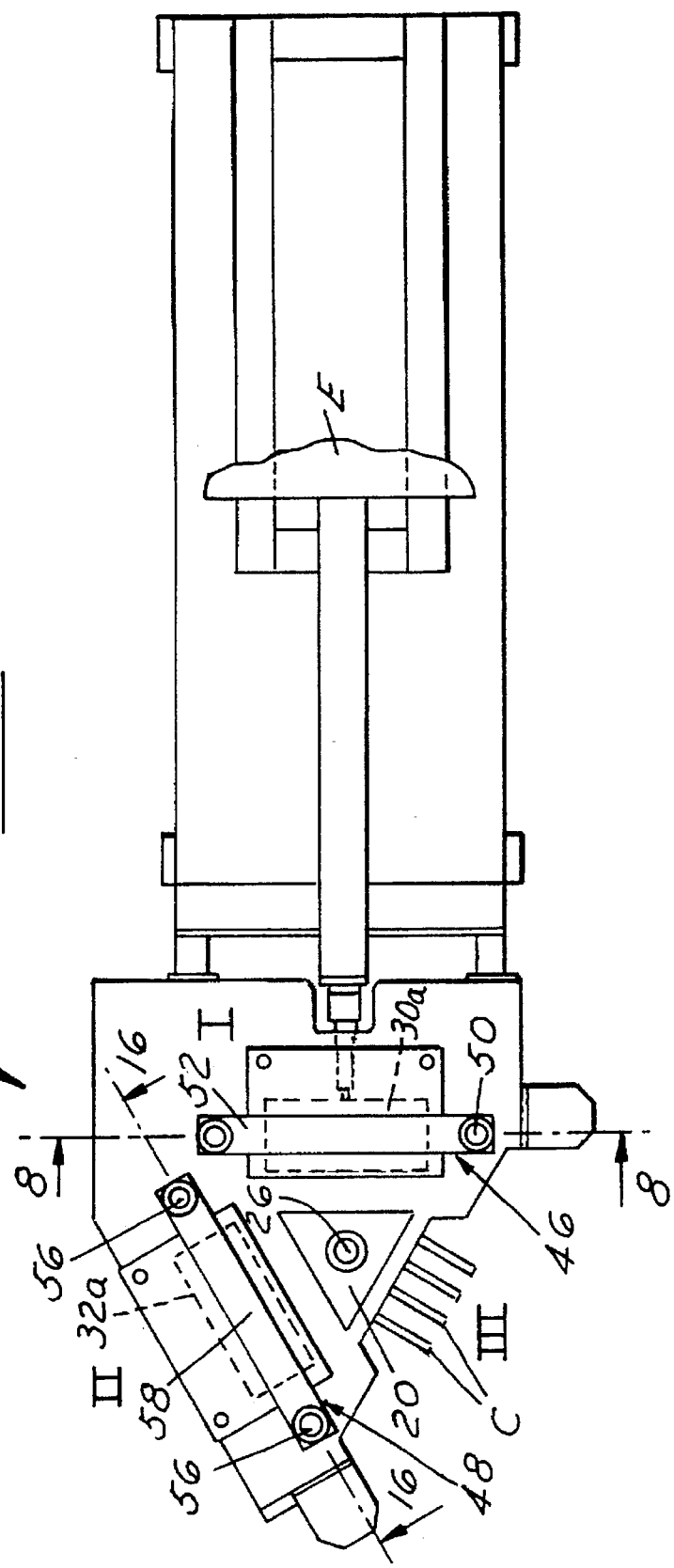
FIG. 4 is a fragmentary plan view of the injection blow molding machine an extruder is shown in FIG. 3, parts being broken away.
Figure 5:
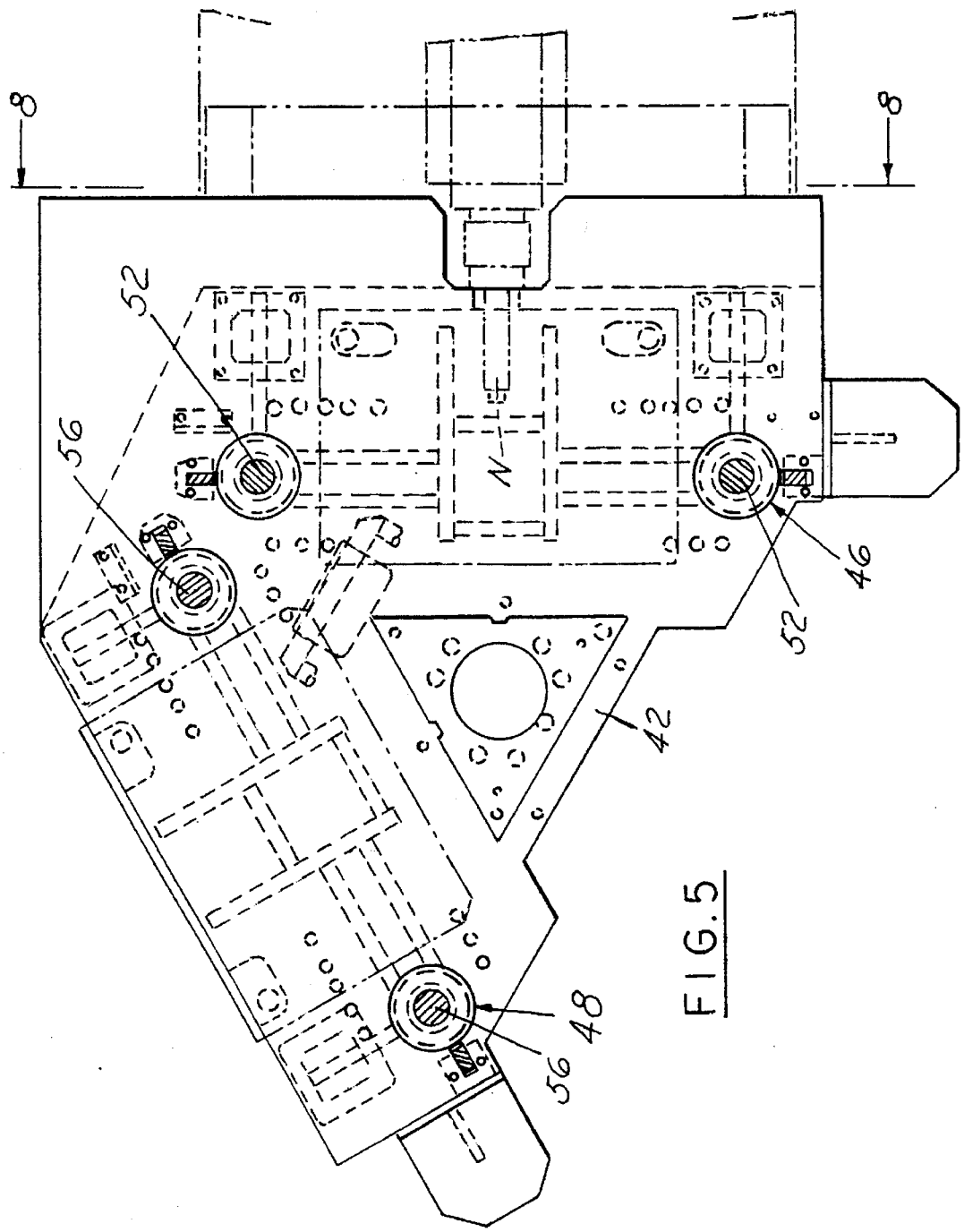
FIG. 5 is a sectional view taken along the line 5—5 in FIG. 2.
Figure 6:
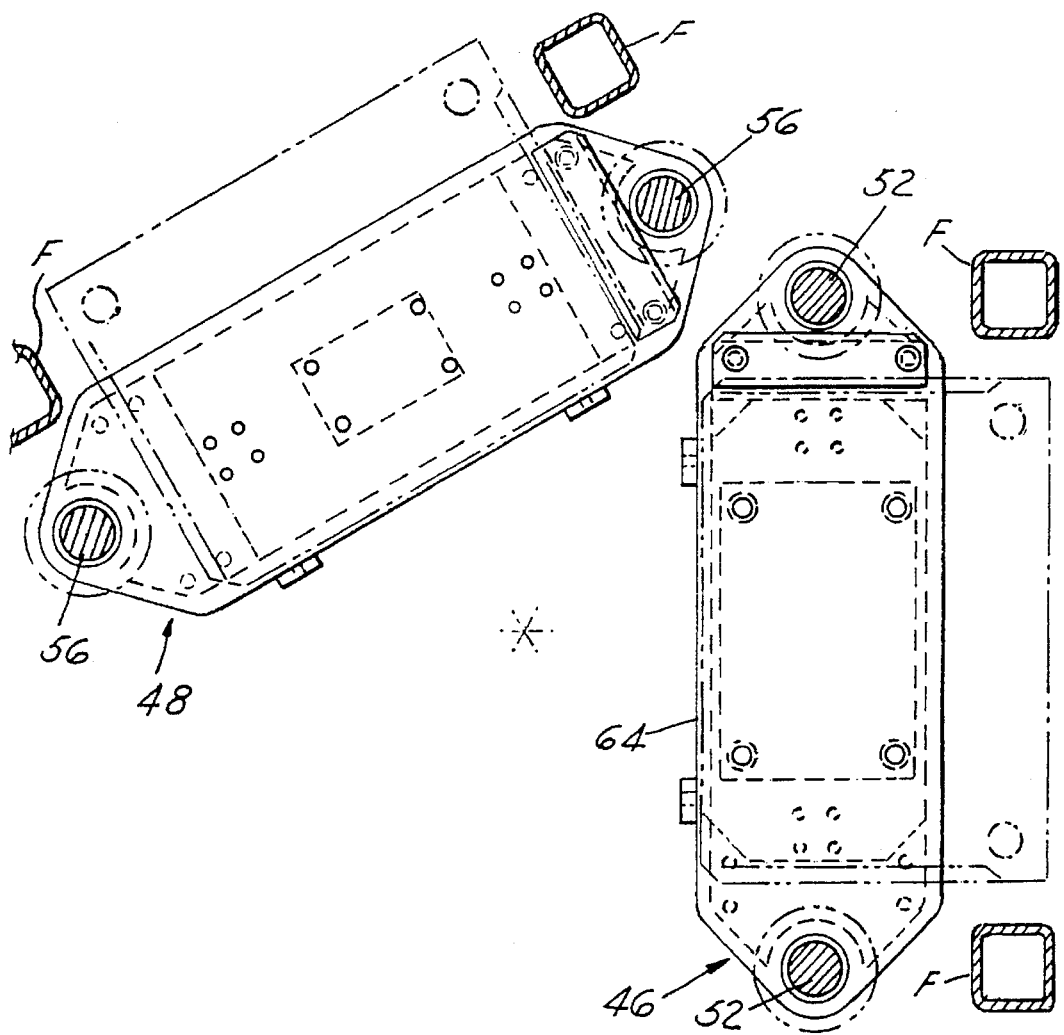
FIG. 6 is a sectional view taken along the line 6—6 in FIG. 2.
Figure 10:
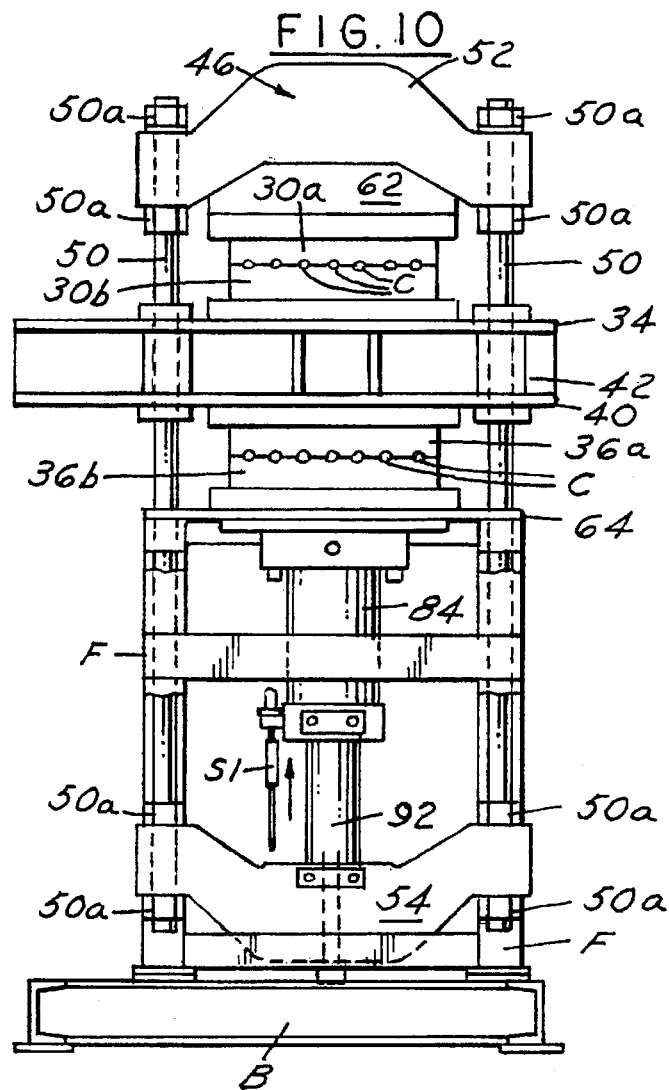
FIG. 10 is a view similar to FIG. 9 showing a further position.
Figure 11:
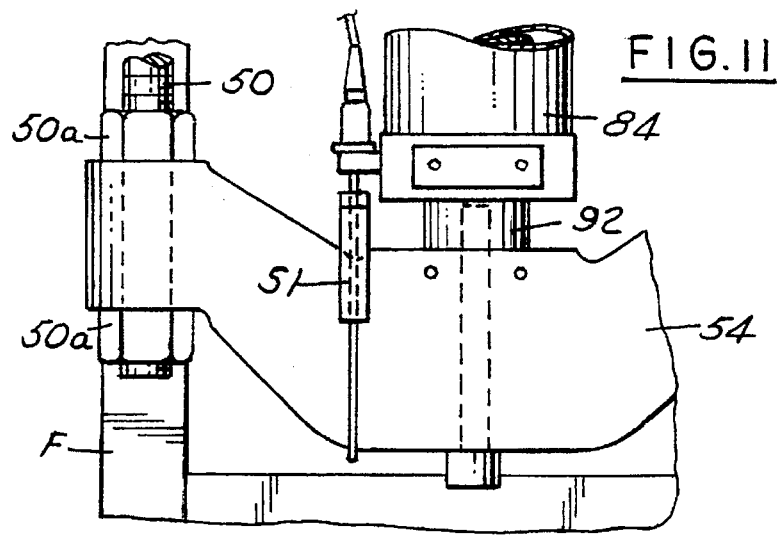
FIG. 11 is a fragmentary elevational view in another operating position.

Referring to FIG. 3, the injection blow molding machine with stacked molds includes a frame F that includes a base B and an extruder E is mounted adjacent the machine. The extruder E is connected to the machine by a cylinder and rod 44 which is capable of moving the extruder from the solid line position. When in the solid line position, the nozzle tip N of the extruder engages the manifold M having an upper conduit and a lower conduit for supplying molten plastic to the upper injection mold 30 and lower injection mold 36 (FIG. 1). A movable mold support table T is provided adjacent the machine to facilitate changing the molds (FIG. 3). The table T is movable toward and away from the machine to carry away molds or bring molds to the machine.

Referring to FIGS. 4–8, the frame F supports vertical yoke assemblies 46, 48 for moving the movable upper and lower injection mold halves and the upper and lower blow mold halves, respectively.

Referring to FIG. 8, the injection mold yoke assembly 46 adjacent the injection station I comprises vertical shafts 50 that extend through the stationary platen 42 and support yokes 52, 54 at the upper and lower ends thereof. Referring to FIG. 16, the blow mold yoke assembly 48 at the blowing station II comprises a second pair of vertical shafts 56 which extend through the stationary platen 42 and support upper and lower yokes 58, 60.

Referring to FIG. 8, an upper movable platen 62 is fixed on the underside of the upper yoke 52 and supports the upper injection mold half 30a which is fixed on a die plate 30d.

As shown in FIG. 16, the upper blow mold half 32a is mounted on a platen 66 on the upper yoke 58. The lower movable blow mold half 38b is removable mounted on the upper surface of a movable platen 68 which is slidably mounted on the shafts 56.

The movable platens 62, 68 include bearings in the platens through which the respective shafts 50, 56 extend. Nuts 50a, 56a are provided above and below the yokes 52, 54 and 58, 60 to adjust the yokes 52, 54 and 60 on the associated threaded portions of the shafts 50, 56, respectively.

Figure 2:
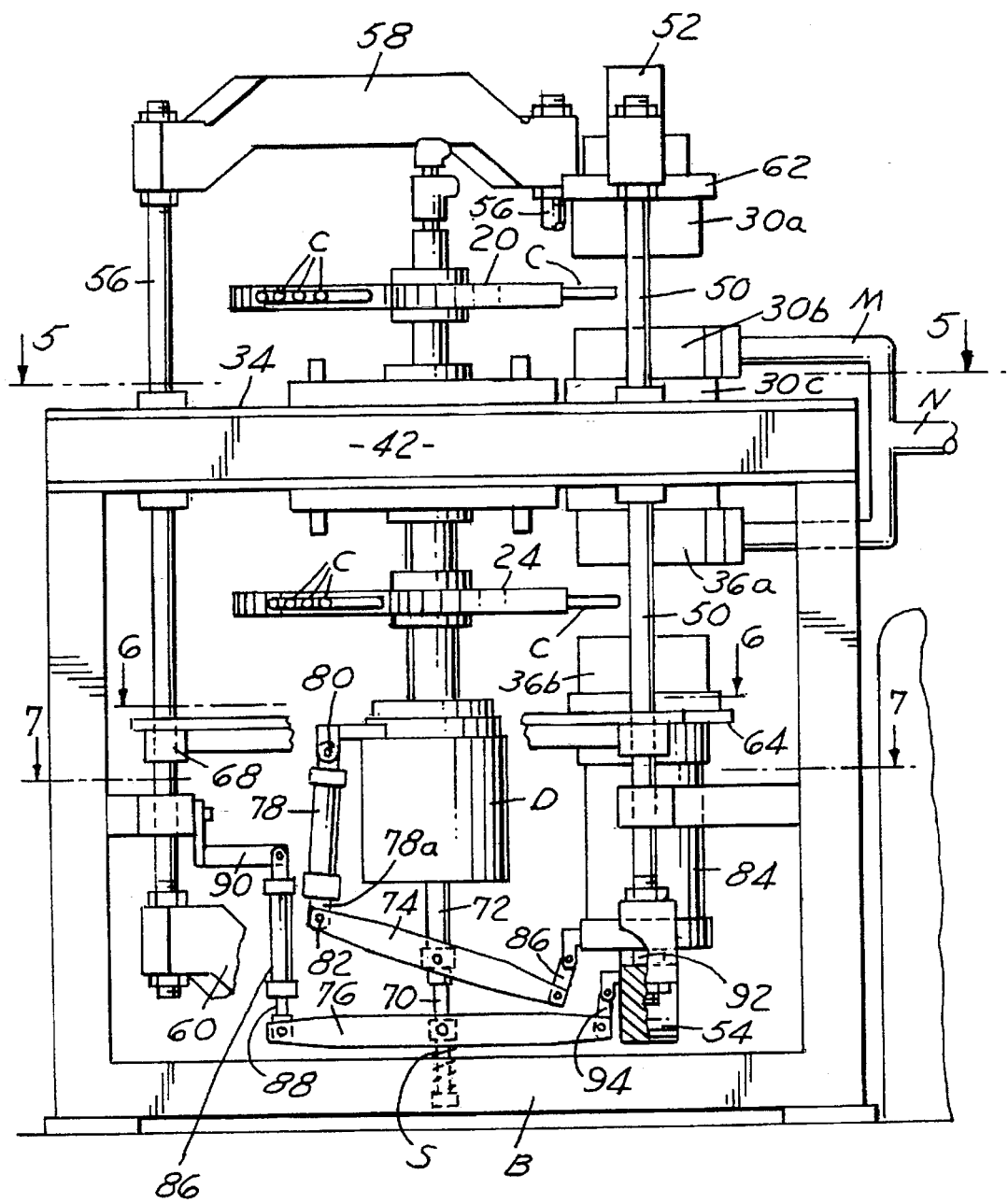
FIG. 2 is an elevational view of the apparatus shown in FIG. 1 taken in the direction of the arrow 2 in FIG. 1.
Figure 19A:
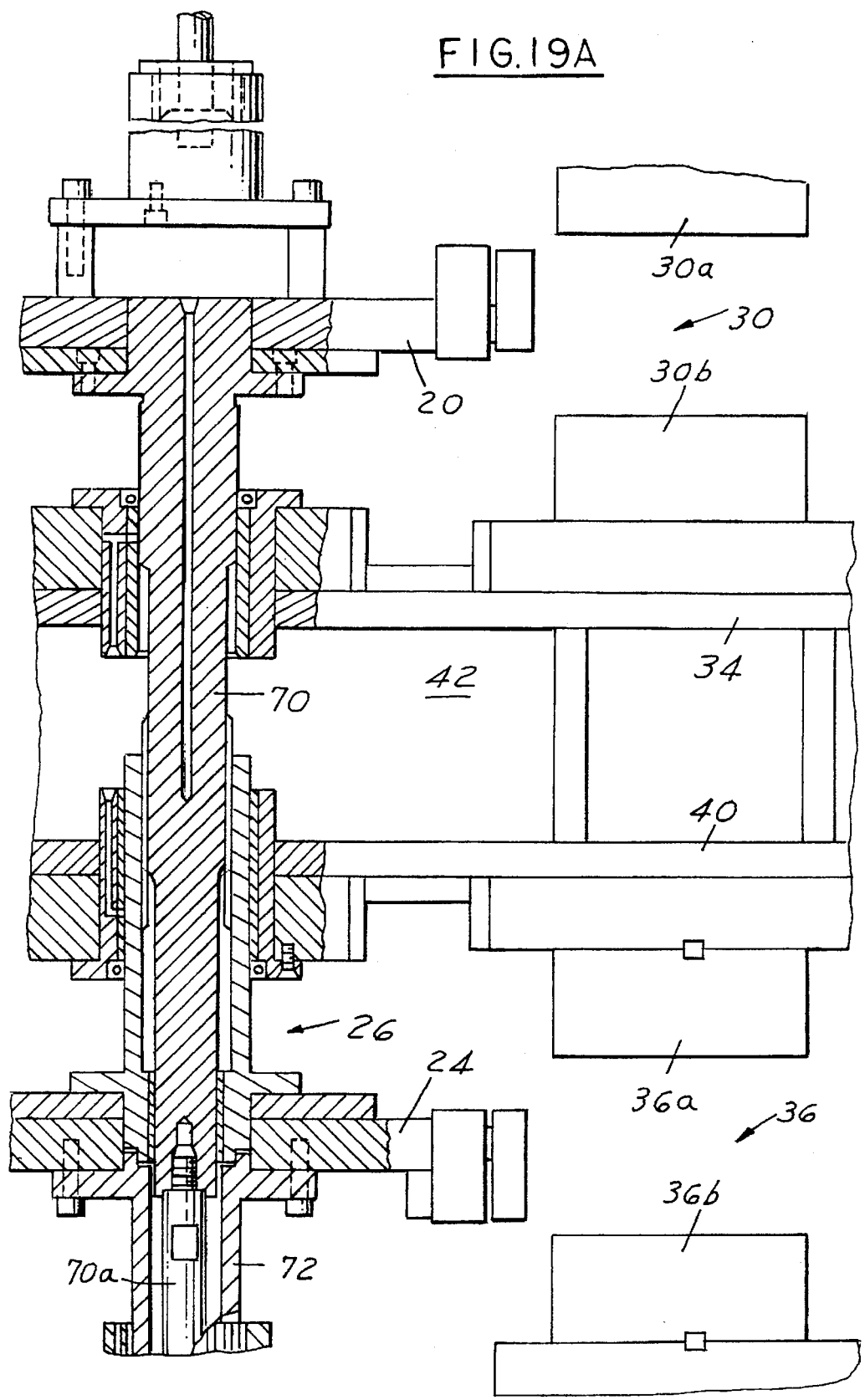
FIG. 19A is a fragmentary vertical part sectional view of the upper portion of the turret and mold operating apparatus.
Figure 19B:
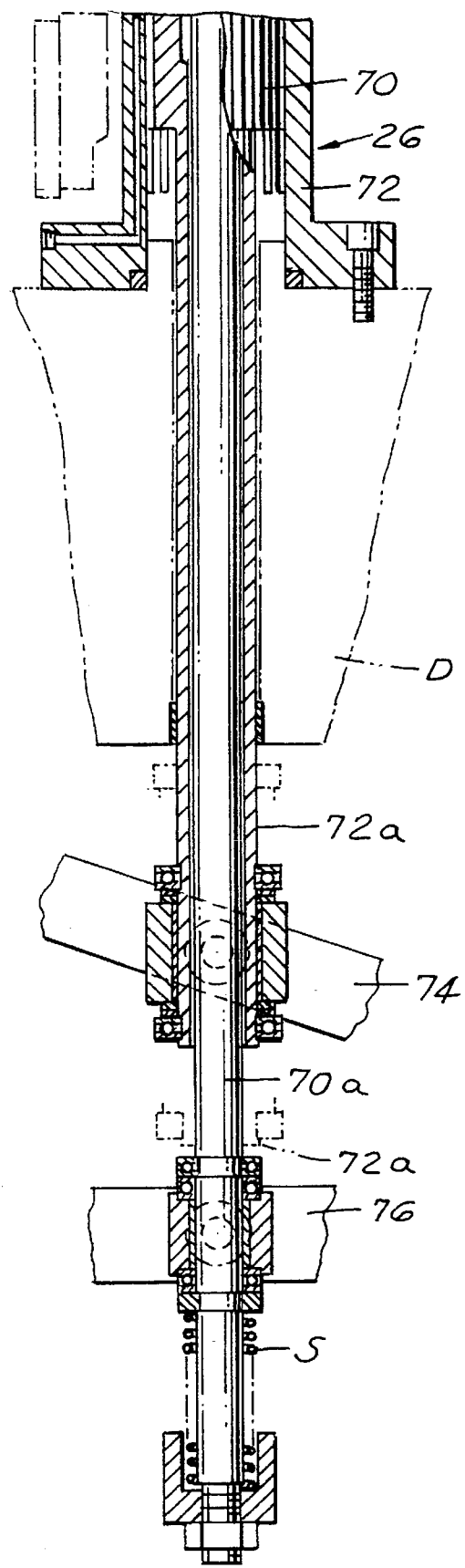
FIG. 19B is a fragmentary vertical part sectional view of the lower portion of the turret and mold operating apparatus.

FIG. 2 is a view looking inwardly toward the hollow delivery station III at which the blown articles are removed, parts being broken away for the purpose of describing the moving of the turret heads for rotation about the vertical axis and the movement of the turret heads vertically. Referring, in addition, to FIGS. 18, 19A, 19B, the upper turret head 20 is supported on the upper end of an inner vertical shaft 70 which extends through stationary platen 42 and is connected by a spline to an outer vertical shaft 72 which extends upwardly through platen 42. Both of shafts 70, 72 form the shaft 26. The outer shaft 72 supports the lower turret head 24.

By proper manipulation of the inner and outer shaft 70 and 72, the upper turret head 20 is moved vertically downwardly to bring the core rods C thereon within the upper injection and blow stationary upper mold halves 30b, 32b and the lower turret head 24 is moved upwardly to bring the turret head 24 and associated core rods C thereon within the lower stationary mold halves 36a, 38a. As shown in FIGS. 2 and 18 a Ferguson drive D is provided and is connected to drive the shafts 70, 72 for indexing the turret heads 20, 24 to the successive positions I, II, III, as is known in connection with the Jomar or Rainville machines which have a single set of molds.

Referring to FIGS. 14, 15A, 15B and 18, in order to provide for opening and closing of the movable injection mold halves 30a as well as vertical movement of the turret heads 22, 24, a first pair of levers 74 are provided and each is pivoted intermediate its ends to the opposite sides of an extension 72a on the outer shaft 72. A second pair of levers 76 is provided and each is pivoted intermediate its ends to opposite sides of an extension 70a on inner shaft 70. One end of the levers 74 is pivotally connected to a cylinder 78 that is pivoted as at 80 to the housing of the Ferguson drive D. The cylinder 78 has its shaft 78a pivoted to the levers 74 as at 82. This cylinder 78 is used for initial adjustment or set up only. The other end of each arm 74 is pivoted to the housing of an operating cylinder 84.

One end of each of the levers 76 is connected to a piston shaft 88 of a cylinder 86 which, in turn, is pivoted to a fixed bracket 90 on frame F and is used for initial adjustment or set up only. The other end of the lever 76 is pivoted to the lower yoke 54 of yoke assembly 46 by a link 94. The piston rod 92 of cylinder 84 is fixed to the lower yoke 54 of the injection mold yoke assembly 46. The cylinder 84 is fixed on the underside of the lower movable platen 64 on which the lower injection mold half 36b is mounted.

In a preferred sequence:
1. The upper yoke 52 starts moving down under action of cylinder 84, bringing the upper injection mold platen 62 downwardly;
2. The associated upper core rods are brought down by movement of the upper shaft;
3. Before the upper injection mold is closed, the upper blow mold begins to close under the action of cylinder 100;
4. The upper injection mold is then closed about the upper core rods;
5. Before the upper blow mold closes fully, the lower injection mold begins to move upwardly and the associated core rods are moved upwardly by the continued action of cylinder 84;
6. Before the lower injection mold closes, the lower blow mold closes under the continued action of the cylinder 100;
7. The lower injection mold is closed; and
8. The lower blow mold is closed.

Figure 14:
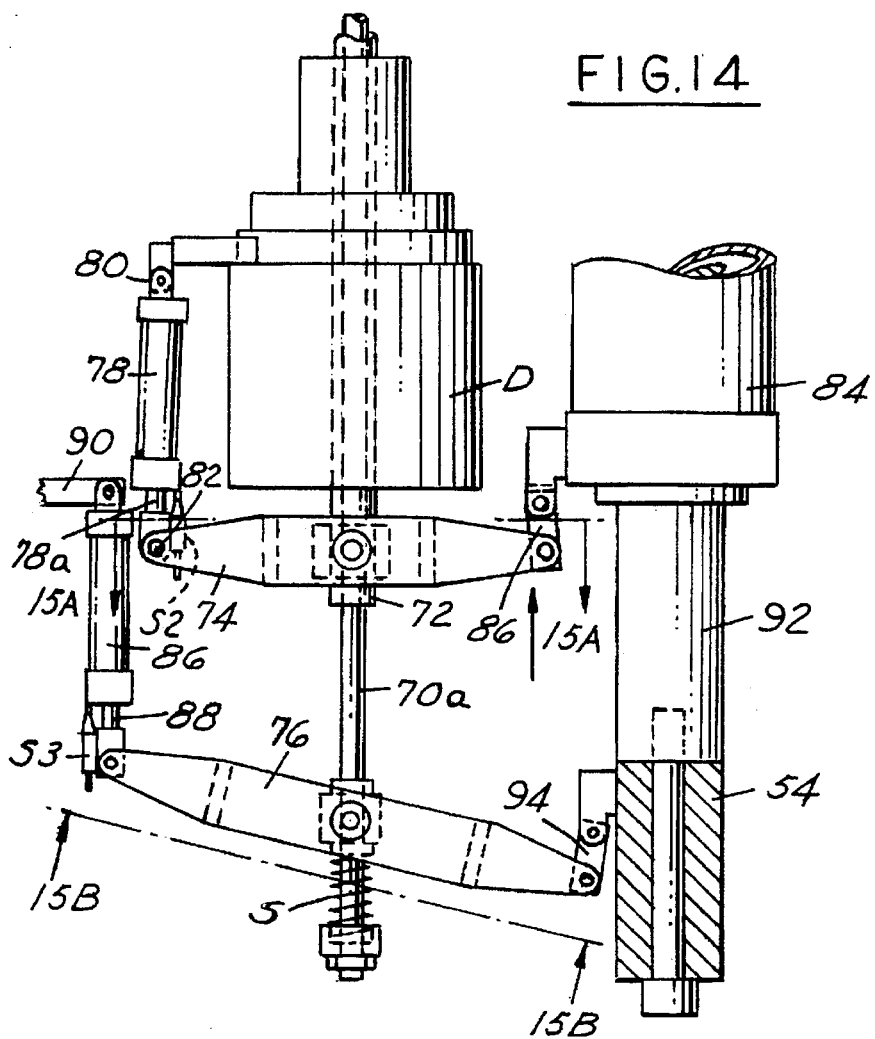
Figure 15B:
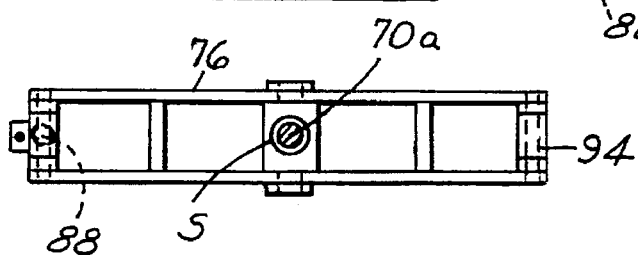
FIG. 15B is a sectional view taken along the line 15B—15B in FIG. 14.
Figure 15A:
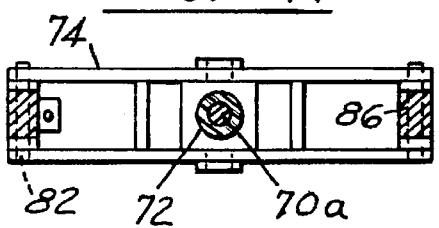
FIG. 15A is a sectional view taken along the line 15A—15A in FIG. 14.

A spring S interposed between the lower end of shaft extension 70a functions as a safety device such that when the upper shaft, for any reason, binds the lower arm 76 compresses the spring S causing engagement with a switch 76a on the frame to signal the electron controller to stop the machine (FIG. 14).

Referring to FIG. 16, in order to move the yokes 58, 60 of the yoke assembly 48 for closing and opening the upper blow mold 32 and lower blow mold 38, a cylinder 100 is provided and has its shaft 102 fixed to lower yoke 60 and its cylinder body 104 fixed to the lower movable platen 68. In order to close the movable upper blow mold half 32a, the cylinder 100 is energized causing the shaft 102 to extend downwardly and move the lower yoke 60 and, in turn, the upper yoke 58 to close the upper blow mold half 32a against the lower fixed blow mold half 32b, the core rods having been positioned by downward movement of the upper turret head 22. Continued energization of cylinder 100 after the blow mold 32 is closed causes the lower movable blow mold half 38b to move upwardly and close against the fixed lower blow mold half 38a, the core rods having been positioned by upward movement of the lower turret head 24 (FIG. 17).

On the reverse cycle, the reverse sequence is followed.

Each of the cylinders is hydraulic and controlled by a circuit such as shown in FIGS. 20A and 20B. Referring to FIG. 20A, a hydraulic circuit for the injection blow molding machine is shown, corresponding portions of the machine being identified by identical reference numerals. Hydraulic fluid from a source of hydraulic fluid such as a pump is supplied to a solenoid operated directional valves 120, controls the direction and amount of flow to and from the cylinder 84 for operating the injection molds. Similarly, a solenoid operated directional valve 122 controls the directional amount of flow to and from the cylinder 100 for operating the blow molds.

Referring to FIG. 20B, the flow of fluid from a source is also supplied to a solenoid operated directional valve 124 for controlling the direction and amount of flow to and from the turret indexing cylinder of Ferguson drive D. Similarly fluid is supplied to a solenoid operated directional valve 126 that controls cylinder 78 and a solenoid operated directional valve 128 for that controls cylinder 86.

Figure 13:
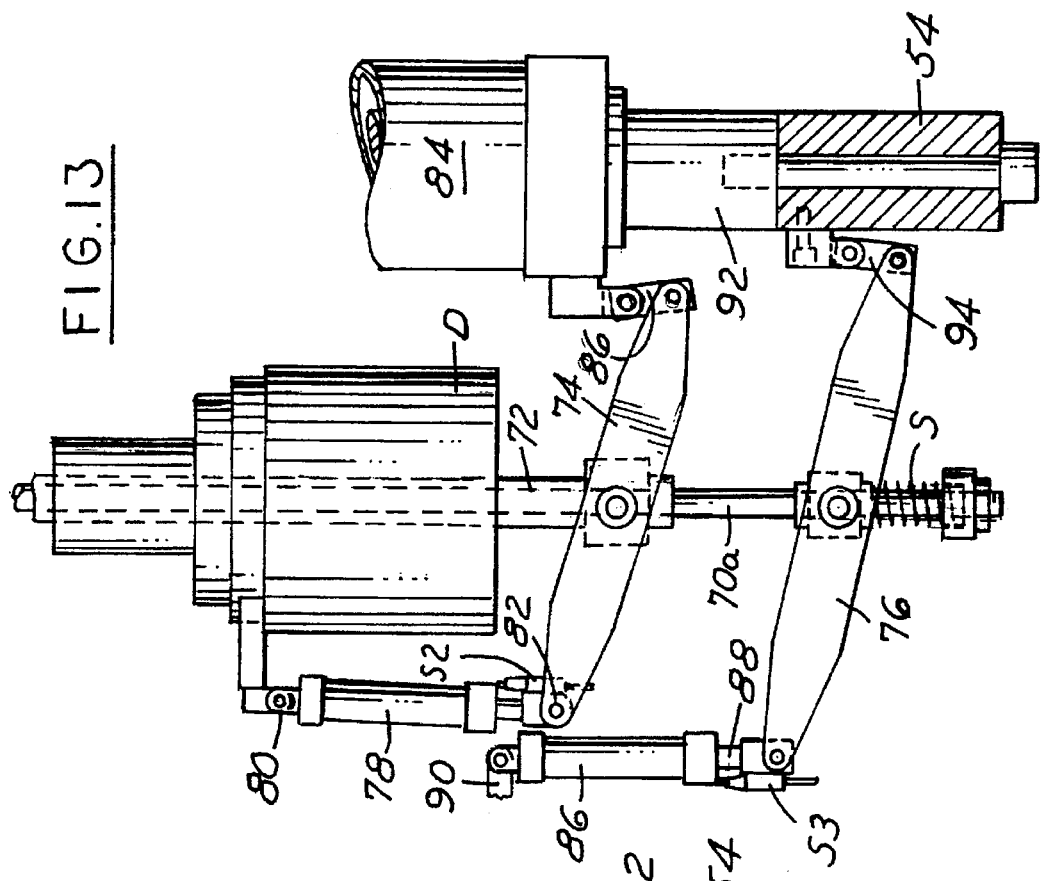
FIGS. 12, 13 and 14 are fragmentary views of the mold closing and opening apparatus.
Figure 12:
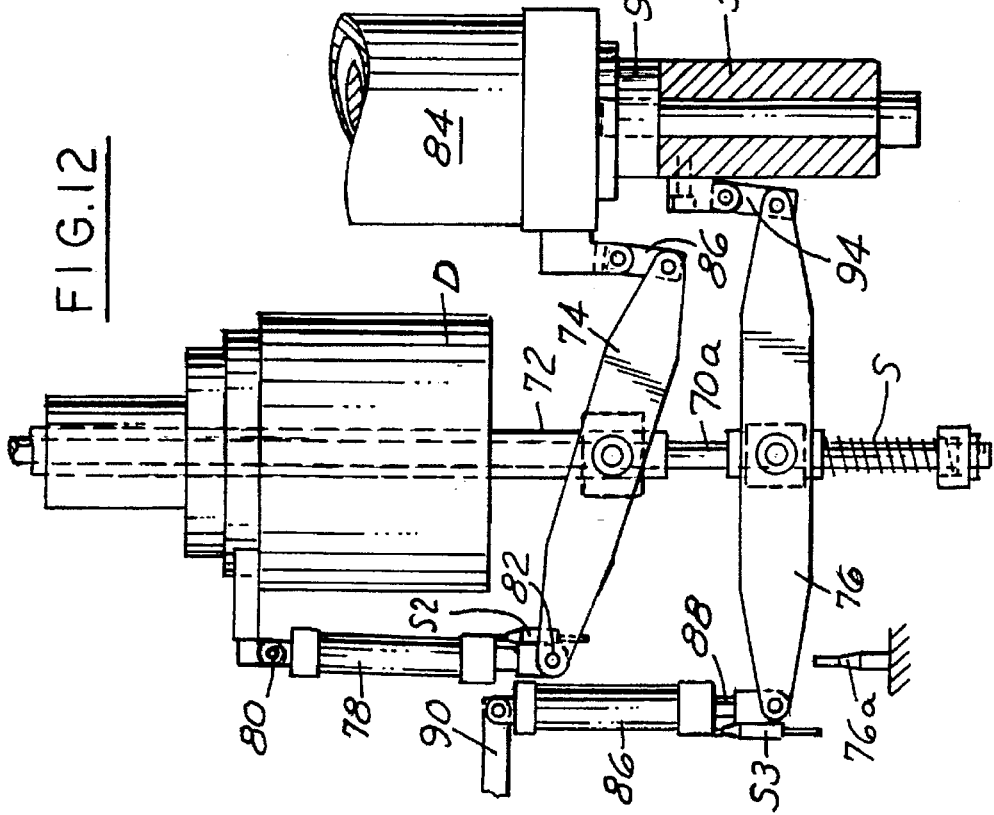

Referring to FIGS. 8–11, a sensor S1 monitors the position of the lower yoke 54 of the injection station I and provides a control signal to a controller which electronically controls the solenoid valves 120, 122, 124, and 126. Referring to FIGS. 12–14, a sensor S2 mounted on piston of cylinder 78 provides a signal to the controller. A sensor S3 on piston rod 88 of cylinder 86 provides a signal to the controller. Referring to FIGS. 16 and 17, a sensor S4 on cylinder 100 senses the position of lower yoke 60 at the blow station II and provides a signal to the controller.

The controller compares the signal from the sensors S1 and S4 to a program and provides the appropriate signal to the solenoid operated valve to achieve the above described cycle of operations. The sensors S2, S3 provide signals for initial adjustment or setting up of the machine.

It can thus be seen that there has been provided a method and apparatus for forming plastic hollow articles such as containers which includes a turret that includes an upper head and a lower head, each of which supports circumferentially spaced sets of core rods. The heads are rotated about a vertical axis and also are moved upwardly and downwardly about the vertical axis for positioning the core rods within the cavities of upper injection mold and upper blow mold and a lower set of injection and a lower set of blow molds. Each mold has an upper half and a lower half. The lower half of the upper mold is mounted in fixed position and the upper half of the lower mold is mounted in fixed position. The upper half of the upper mold and the lower half of the lower mold are movable axially vertically toward and away from their respective fixed mold halves to close about parisons on the core rods. The upper and lower injection molds are supplied with molten plastic through a manifold to which molten plastic material is supplied from an extruder nozzle tip of an extruder.

What is claimed is:

1. An injection and blow molding machine with stacked molds for forming plastic hollow articles comprising a stationary platen, means for supporting said stationary platen in horizontal position with said platen having an upper and lower surface, an upper injection mold, said upper injection mold including an upper injection mold half and a lower injection mold half which cooperate to define a plurality of cavities, said lower injection mold half being mounted on the upper surfaces of the stationary platen, first means for supporting said upper injection mold half for movement toward and from said lower injection mold half, an upper blow mold for blowing hollow articles such as containers, said upper blow mold including an upper mold half and a lower mold half which cooperate to define a plurality of cavities, said lower blow mold half being mounted on the upper surface of the stationary platen, second means for supporting said upper blow mold half for movement toward and from said lower blow mold half, a lower injection mold, said lower injection mold including an upper mold half and a lower mold half defining a plurality of cavities, said upper injection mold half of said lower injection mold being mounted on the lower surface of the stationary platen, means for supporting said lower injection mold half of said lower injection mold for movement toward and from said upper injection mold half of said lower injection mold, a lower blow mold said lower blow mold including an upper mold and a lower mold defining a plurality of cavities, said upper mold half of said lower blow mold being mounted on the lower surface of the stationary platen, means for supporting said lower blow mold half of said lower blow mold for movement toward and from said stationary upper mold half of said lower blow mold, a first upper turret having a triangular configuration having three surfaces, a plurality of core rods, means supporting a first plurality of core rods along each of said surfaces of said first turret in horizontal position, a second lower turret having a triangular configuration having three surfaces, a plurality of core rods, means for supporting a second plurality of core rods on each of said surfaces of said second turret in horizontal position, shaft means extending through said stationary table and supporting said first turret and second turret for rotation and vertical movement with said first turret being associated with said upper injection mold and said upper blow mold and said second turret being associated with said lower injection mold and said lower blow mold, means for intermittently rotating said turrets, means for moving said first turret for reciprocating vertical movement to bring the core rods of said first turret into and out of position with respect to said upper stationary injection mold half and said upper stationary blow mold half and to bring said core rods of said second turret into and out of position with respect to said lower stationary injection mold half and said lower stationary blow mold half, first means for moving said upper movable mold halves into and out of mold closed position, and second means for moving said lower movable mold halves into and out of closed position.

2. The injection blow molding machine with stacked molds set forth in claim 1 wherein said means for moving said turrets vertically and said means for opening and closing said molds comprises operating means for sequentially moving the turrets and the movable molds to (a) bring first plurality of core rods into the upper stationary mold cavities, (b) bring the second plurality of core rods into the lower stationary mold cavities, (c) move the upper movable mold halves to close the upper sets of molds, and (d) move the lower movable mold halves to close the lower mold halves.

3. The injection blow molding machines with stacked molds as set forth in claim 2 including hydraulic cylinder means having a cylinder and a cylinder shaft, said shaft means including a first vertical shaft supporting said first turret, a second vertical shaft telescoped with respect to said first shaft and supporting said second turret, a first lever pivoted intermediate its ends to said second vertical shaft, a second lever pivoted intermediate its ends to said first vertical shaft, said first and second levers having one end normally in fixed pivoted position and the other end pivoted to said operating cylinder and cylinder shaft, respectively, said cylinder shaft being operable to close the upper mold halves, and said cylinder being operable to close the lower mold halves.

4. The injection blow molding machine with stacked molds set forth in claim 3 including a second hydraulic cylinder for adjusting the position of said fixed pivot of said one end of said first lever.

5. The injection blow molding machine set forth in claim 3 including a third hydraulic cylinder operable to be energized to hold said one end of said second lever fixed during said closing of said upper mold and said lower molds.

6. The injection blow molding machine set forth in claim 3 wherein said operating means is operable to close and open said injection mold halves.

7. The injection blow molding machine set forth in claim 6 wherein said first and second means includes a cylinder means for closing and opening said upper and lower blow molds.

8. The injection blow molding machine set forth in claim 2 including a first yoke assembly comprising a pair of vertical shafts extending through and movable relative to said stationary platen, an upper yoke mounted the upper ends of said pair of shafts, a lower yoke mounted on the lower ends of said shafts, said upper injection mold half of said upper injection mold being fixed on said upper yoke, a movable platen slidably mounted on said pair of shafts below said stationary platen, cylinder means extending between said movable platen and said lower yoke, said lower movable injection mold half being mounted on said movable platen.

9. The injection blow molding machines with stacked molds as set forth in claim 8 including hydraulic cylinder means having a cylinder and a cylinder shaft, said shaft means including a first vertical shaft supporting said first turret and a second vertical shaft telescoped with respect to said first shaft and supporting said second turret, a first lever pivoted intermediate its ends to said second vertical shaft, a second lever pivoted intermediate its ends to said first vertical shaft, said first and second levers having one end normally in fixed pivoted position and the other end pivoted to said operating cylinder and cylinder shaft, respectively, said cylinder shaft being operable to close the upper injection mold, and said cylinder being operable to close the lower injection mold.

10. The injection blow molding machine with stacked molds set forth in claim 9 including a second hydraulic cylinder for adjusting the position of said fixed pivot of said one end of said first arm.

11. The injection blow molding machine set forth in claim 9 including a third hydraulic cylinder operable to be energized to hold said one end of said second arm fixed during said closing of said upper injection mold and operable during initial setting.

12. The injection blow molding machine set forth in claim 8 including a second yoke assembly comprising a pair of vertical shafts extending through and movable relative to said stationary platen, an upper yoke fixed on the upper ends of said pair of shafts, a lower yoke fixed on the lower ends of said shafts, said upper mold blow mold half of said upper blow mold being mounted on said upper yoke, a movable platen slidably mounted on said pair of shafts below said stationary platen and supporting said movable lower blow mold half, and hydraulic cylinder means extending between said movable platen and said lower yoke.

13. The injection blow molding set forth in claim 1 including a first yoke assembly comprising a pair of vertical shafts extending through and movable relative to said stationary platen, an upper yoke mounted on to the upper ends of said pair of shafts, a lower yoke mounted on the lower ends of said shafts, said upper injection mold half of said upper injection mold being fixed on said upper yoke, a movable platen slidably mounted on said pair of shafts below said stationary platen, cylinder means extending between said movable platen and said lower yoke, said lower movable injection mold half being mounted on said movable platen.

14. The injection blow molding machines with stacked molds as set forth in claim 13 including cyliner means including a cylinder and cylinder shaft, said shaft means including a first vertical shaft supporting said first turret and a second vertical shaft telescoped with respect to said first shaft and supporting said second turret, a first lever pivoted intermediate its ends to said second vertical shaft, a second lever pivoted intermediate its ends to said first vertical shaft, said first and second levers having one end normally in fixed pivoted position and the other end pivoted to said operating cylinder and cylinder shaft, respectively, said cylinder shaft being operable to close the upper injection mold, and said cylinder being operable to close the lower injection mold.

15. The injection blow molding machine with stacked molds set forth in claim 14 including a second cylinder for adjusting the position of said fixed pivot of said one end of said first arm.

16. The injection blow molding machine set forth in claim 15 including a third cylinder operable to be energized to hold said one end of said second arm fixed during said closing of said upper injection mold and operable to be de-energized for initial setting.

17. The injection blow molding machine set forth in claim 13 wherein said means for closing and opening said blow molds composes a second yoke assembly at said blow molding station comprising a pair of vertical shafts extending through and moavable reactive to said stationary platen, an upper yoke fixed on the upper ends of said pair of shafts, a lower yoke fixed on the lower ends of said shafts, said upper mold blow mold half of said upper blow mold being mounted on said upper yoke, a movable platen slidably mounted on said pair of shafts below said stationary platen and supporting said movable lower blow mold half, and cylinder means extending between said movable platen and said lower yoke.

18. The injection blow molding machine set forth in claim 1 including a first yoke assembly at said injection station comprising a pair of vertical shafts extending through and movable relative to said stationary platen, an upper yoke mounted on to the upper ends of said pair of shafts, a lower yoke mounted on the lower ends of said shafts, said upper injection mold half of said upper injection mold being fixed on said upper yoke, a movable platen slidably mounted on said pair of shafts below said stationary platen, cylinder means extending between said movable platen and said lower yoke, said lower movable injection mold half being mounted on said movable platen, a second yoke assembly at said blow molding station comprising a pair of vertical shafts extending through and moavable reactive to said stationary platen, an upper yoke fixed on the upper ends of said pair of shafts, a lower yoke fixed on the lower ends of said shafts, said upper mold blow mold half of said upper blow mold being fixed on said upper yoke, a movable platen slidably mounted on said pair of shafts below said stationary platen and supporting said movable lower blow mold half, and cylinder means extending between said movable platen and said lower yoke, and means interconnecting said first yoke assembly to said means for opening and closing said upper and lower injection molds, and means for interconnecting said second yoke assembly to said means for opening and closing said upper and lower blow molds.

19. The injection blow molding machine set forth in claim 18 wherein said means for moving said turrets vertically and said means for opening and closing said molds comprises operating means for sequentially moving the turrets to (a) bring the first plurality of core rods into the upper stationary mold cavities, (b) bring the second plurality of core rods into the lower stationary mold cavities, (c) move the upper movable mold halves to close the upper sets of molds, and (d) move the lower movable mold halves to close the lower mold halves.

20. The injection blow molding machine set forth in any one of claims 1–19 including sensing means for sensing the relative positions of said injection mold halves and said blow mold halves and providing a signal to a controller to control the cycle.

* * * * *